Patented June 12, 1945

2,378,148

UNITED STATES PATENT OFFICE

2,378,148

PROCESS OF TREATING TITANIUM OXIDE PIGMENTS

Robert M. McKinney, Wilmington, Del., assignor to E. I. du Pont de Nemours & Company, Wilmington, Del., a corporation of Delaware No Drawing. Application March 1, 1941, Serial No. 381,381

6 Claims. (Cl. 106—300)

This invention relates to novel types of pigment treating agents, and more particularly to novel flocculating or coagulating agents useful for treating deflocculated titanium oxide pigment-containing suspensions.

In the production of pigments more preferentially wetted by water than by oil, such as titanium dioxide, titanates, etc., relatively high calcination temperatures are resorted to, to develop essential pigment properties. To reduce the size of the coarser pigment particles and eliminate aggregates or agglomerates formed by sintering during such calcination, the calcined titanium pigment is wet ground in standard types of grinding media, such as pebble or colloid mills. Such coarser pigment particles and/or aggregates must be removed ffrom the finished pigment, because, if present therein and subsequently incorporated in coating compositions, such as paints, smooth, unbroken or glossy paint or enamel films cannot be obtained. Grinding the pigment will, to some extent, effect disintegration and removal of a portion of the coarser pigment particles or aggregates, but will not effectively and completely eliminate them. Various types of continuous grinding and hydroseparation systems have therefore been proposed with a view to bringing about this latter result. Among those particularly useful for this purpose are the grinding and elutriating systems shown in United States patents to Hanahan 1,826,131 and 1,937,037, wherein the previously calcined, ground pigment is dispersed in aqueous media with the aid of a small amount (about .1 to 1%) of dispersing agents, (various alkaline reacting alkali metal compounds, such as sodium silicate, sodium hydroxide, sodium aluminate, sodium carbonate, as well as aqua ammonia, or mixtures thereof), and then fractionated into varying particle sizes, i. e., of substantially 15 microns or less, by hydro-separation or elutriation. During such hydroseparation, the pigment, while suspended in an aqueous elutriating liquid, is caused to pass upwardly through one or more separatory vessels, the rate of liquid flow being at such a constant and regulated rate as to carry with it pigment particles of such fineness that their rate of fall is less than the upward rate of flow of the liquid. As a result, the coarser or larger pigment particles settle out and the pigment fines, e. g., of 15 microns or less, are retained in and pass on with the overflow from the elutriator. The separated coarse particles or rejects may be reground and again subjected to hydroseparation. The dispersed pigment fines in the overflow fraction are still unfit for use in paints or the like. To render them so, it is necessary to remove substantially all of the water and water-soluble compounds present in the pigment suspension. This is usually accomplished by acidifying the suspension, allowing the flocculated pigment slurry to settle, and then filtering, washing, drying and crushing to break up the lumps formed on drying.

Deflocculated titanium oxide pigment slurries settle only with great difficulty and after prolonged standing. The pigment particles, even in relatively thick slurries, are in such finely-divided state that they cannot be filtered in normal filtration equipment, such as filter presses, suction leaf filters, or rotary filters. For example, at the outset of filtration, a large part of the deflocculated pigment fails to be retained by the filter cloths, passing therethrough along with the filtrate. Again, a certain proportion of the pigment is retained in and rapidly closes the interstices of the filter cloths, preventing necessary free passage of the filtrate or subsequent wash water. The resulting high pigment losses in the filtrate and formation of a thin, hard pigment cake on the filter cloths, which cannot be washed away or removed by water, renders this type of operation uneconomical and disadvantageous.

If the pigment fines-containing overflow should be flocculated by acidification, such as with sulfuric acid, to obtain a preferable pH of about 4, pigment settling for subsequent filtration can be had. But this requires large amounts of acid to effect coagulation, and the recovered pigment product exhibits certain undesired characteristics. For instance, large quantities of water-soluble salts, such as sodium sulfate and the like, are formed in such process, which, due to the highly adsorptive nature of the pigment, remain therein to contaminate the final titanium pigment. Obviously, these soluble salts adversely affect the durability and weathering characteristics of the product and seriously impair its usefulness, especially in paints or enamels, or in formulations to be employed in outside exposures. These objectionable soluble salts cannot be completely removed by washing, and it is not economically practical to resort to washing of the filtered pigment to effect even their partial removal. Effecting coagulation at a pH of about 4 is also disadvantageous because the resultant pigment is distinctly acid in character and unsuited for many paint uses and other purposes. If higher pH values are resorted to, this is offset by the uneconomical pigment-separating operation which follows, e. g., the settling becomes too slow and the resultant slurry contains too small a percentage of pigment. Also, the filtered titanium pigments from acid-coagulating processes, when dried, tend to cement together to form lumps which can be broken down, if at all, only with difficulty by dry grinding or disintegration. This, of course, largely offsets the beneficial effects obtained by the previous wet grinding. A further instance of the undesirability of acid treating titanium oxide pigment slurries to effect flocculation resides in the fact that the slightly acid, finished pigment which is recovered, when employed in baking enamels, exhibits an undesired and appreciable color change or yellowing after subjection to the high temperatures necessarily employed in effecting the drying of such enamels.

It is among the objects of this invention to overcome these and other disadvantages in prior titanium pigment-separating methods, and to provide a novel type of flocculating agent which is particularly useful for obtaining these desired results, and which enables the production of an improved $TiO_2$ pigment exhibiting improved color, tinting strength and oil absorption properties, together with relatively complete freedom from grit or aggregates.

These and other objects and advantages are obtainable in the present invention, which broadly comprises employing as a flocculating agent in effecting the separation of coarser from finer fractions of a calcined titanium pigment, more preferentially wetted by water than by oil, a small amount of a water-soluble salt of a trivalent metal.

In a more restricted sense, the invention comprises flocculating a previously deflocculated suspension of calcined titanium oxide pigment by incorporating therein at least .25%, on the $TiO_2$ basis and calculated as the oxide of the metal, of an acid-reacting, soluble salt of aluminum, chromium or iron.

In a more specific and preferred embodiment, the invention comprises adding to a deflocculated suspension of a phosphate-containing titanium oxide pigment, comprising the overflow fraction of an elutriating or hydroseparating system, a relatively small amount, corresponding to at least .25% $Al_2O_3$ on the $TiO_2$ basis, of aluminum sulfate or a solution thereof, and adjusting the pH value of the resulting coagulated slurry within a range of from about 6.8 to about 7.6 through employment of an alkaline earth metal compound as a neutralizing agent, in order to avoid the introduction of soluble salts into said pigment.

In adapting the invention to practice in one preferred embodiment employing a continuous grinding and hydroseparation system, an aqueous suspension of calcined titanium oxide pigment, having a phosphate content of about .5%, containing about 10 to 15 parts by weight of water to 1 part by weight of pigment, and about .5% of a suitable dispersing or deflocculating agent, such as sodium silicate, may be fed into a continuous ball or tube mill by a tube extending into the end of the mill or by a scoop feeder. During passage through the mill, the pigment is reduced by grinding to suitable fineness, and fed continuously from the mill discharge into a hydroseparator tank or elutriating system, such as described in said Hanahan patents. The pigment fines are overflowed, the coarser pigment particles or rejects being returned to the mill for further grinding. The overflow fraction is conducted to a smaller receiving tank, wherein, preferably, about 4 parts of octodecahydrated aluminum sulfate crystals per 100 parts of pigment, or a solution of the same (corresponding to .6% $Al_2O_3$ on the $TiO_2$ basis) is added as a coagulant or flocculating agent. Agitation of the pigment suspension with the coagulant to effect more intimate mixture therebetween in this tank may be resorted to, if desired. The resulting flocculated pigment suspension is then passed to a second settling tank, similar in dimensions to the hydroseparator tank, wherein the pigment settles rapidly forming a slurry containing in the neighborhood of about 2 parts of water to 1 part of pigment. This slurry is then filtered in normal equipment employed for the purpose, the pigment being then washed, dried, and, after crushing to break up lumps formed on drying, is ready for use.

In order that the invention may be more clearly understood, the following examples are given, each of which is merely illustrative in character, and in no wise in limitation of the underlying concepts of the invention:

Example I 100 parts by weight of calcined and finely-ground titanium dioxide dispersed in 800 parts by weight of water with .12 part sodium hydroxide as the dispersing agent, were flocculated by addition of 4 parts of alum (equivalent to .6% $Al_2O_3$) as the crystals, by thoroughly stirring the same into the pigment slurry. The pH was adjusted to 6.9 by the addition of the required amount of barium hydrate as a concentrated solution. The slurry was stirred for two hours and then allowed to stand in a quiescent condition for 16 hours. At the end of this time the supernatant liquid was decanted off and the thickened slurry filtered and dried.

Example II

The pigment used in this example was obtained from a closed circuit wet grinding system operating on titanium dioxide containing .35% $P_2O_5$. The hydroseparator overflow contained 140 grams $TiO_2$/liter and the rate of flow was 600 cc./minute. This dispersed slurry was collected in a large tank and heated to 60° C. The pigment was coagulated by the addition of a stream of alum solution containing 55 grams $Al_2(SO_4)_3.18 H_2O$/liter. The rate of addition of the latter was 100 cc./minute. The tank after being filled was adjusted to a pH of 7.3 by the addition of sufficient barium hydrate crystals.

Example III

The process of Example II is repeated but the overflow from the hydroseparator was divided into two portions, one of which was 500 cc./minute, while the other was 100 cc./minute. The larger portion was added directly to the large tank while the smaller amount was by-passed through a smaller tank equipped with an agitator and to this tank was added .84 gram of alum crystals per minute. The overflow passed on to the larger tank in a continuous manner. After collecting a substantially full tank of the pigment slurry the agitator was discontinued and substantially half of the water was removed by decomposition. The pH was then adjusted to 7.2 by the addition of a concentrated barium hydrate solution.

While specific proportions of pigment, water, dispersing, and neutralizing agents have been given in the preceding examples, obviously these are subject to wide variance, as are the dispersing or neutralizing agents employed. The amount and character of flocculating or coagulating agent which is required, however, is critical in obtaining optimum results hereunder. Generally, the amount of phosphate present in the $TiO_2$, the character of pigment slurry desired, and the ultimate properties desired in the finished pigment will govern as to the required amounts of coagulating agent. I have found that while the amount of agent is usually relatively small, it must approximate at least .25% and may range to as high as about 2.5%, based on the weight of the $TiO_2$, and calculated as $Al_2O_3$, $Cr_2O_3$ or $Fe_2O_3$, in order that such optimum benefits will result. Accordingly, such range is preferred for use. A more highly useful, most practical range comprises from about .5 to about 1.5 grams $Al_2O_3$ (or $Cr_2O_3$ or $Fe_2O_3$) per 100 grams of pigment in suspension, with an amount of 1% being normally the most effective.

Although in the above examples the coagulation step is conducted at certain specified temperatures, these are not critical to the invention, although usually such coagulation is conducted at temperatures in excess of 30° C. Preferably, I effect such coagulation while maintaining the dispersed slurry at a temperature ranging from about 40–60° C., although higher temperatures, up to about 80 or 90° C., may be used, if desired.

While, in its preferred adaptation, the invention has been exemplified employing aluminum sulfate, I have found that generally the soluble salts of the trivalent metals other than aluminum, such as those of chromium and iron, and especially the sulfates and chlorides thereof, are also useful in the invention. Thus, in addition to aluminum sulfate, any acid-reacting soluble salt of aluminum, such as aluminum nitrate, the aluminum halides, the various alums, or the like, as well as any soluble chromic or ferric salt, may be employed in the invention. Specific examples of these include ammonium aluminum sulfate, cesium aluminum sulfate, potassium aluminum sulfate, sodium aluminum sulfate, rubidium aluminum sulfate, aluminum acetate, aluminum bromate and aluminum chloride, bromide or iodide. Examples of soluble chromic salts include chromic sulfate, the chromic halides, such as the chloride, bromide or iodide, chromic acetate, chromic nitrate, the chrome alums, such as chromic potassium alum, etc. Similarly, examples of soluble ferric salts include ferric acetate, the ferric halides, such as ferric chloride, bromide or iodide, ferric alums, ferric nitrate, ferric sulfate, etc.

While, preferably, the soluble trivalent metal salts useful in the invention are individually employed, it may be desirable in some instances to employ them in admixed state, and use of mixtures thereof is accordingly contemplated. In such instances, however, the amount of mixed salt so employed approximates substantially the amount which would be utilized, where the individual salt used.

Aluminum sulfate, and particularly octodecahydrated aluminum sulfate, exerts somewhat superior flocculating properties when employed in calcined titanium oxide pigments, and this fact coupled with its economic availability, renders such agent particularly adaptable and preferable for use in flocculating this type of pigment.

Also, while I preferably employ barium hydroxide as a neutralizing agent for the purpose of adjusting the pH value of the coagulated pigment slurry within the above specified range, other alkaline earth metal neutralizing agents, and particularly those comprising calcium and strontium compounds or mixtures thereof, may be used. Thus, for the purpose I may employ the oxides, hydroxides and carbonates of barium, calcium and strontium. The use of these alkaline earth agents, and especially the hydroxides and carbonates of barium and strontium, is especially desirable because they serve the dual purpose of (1) effecting desired pH adjustment, and (2) forming insoluble sulfates, causing precipitation by reaction with the coagulating agent of insoluble aluminum, chromium and ferric hydrates, advantageous $TiO_2$ pigment treating agents. Concurrent with the precipitation through neutralization of these hydrated oxides onto the pigment, I advantageously avoid the formation and introduction of soluble salts, such as sodium sulfate, into the pigment, which results when pH adjustment is effected by use of, for instance, sulfuric acid.

It will be found that the titanium pigment products obtained from a practice of the invention will exhibit many desirable properties not previously attainable. Thus, due to the fact pigment flocculation is effected with a minimum quantity of coagulating agent, and the aluminum is precipitated as a water-insoluble compound, i e., $Al_2O_3$, formation of substantial amounts of water-soluble salts in the pigment is effectively avoided. Furthermore, since pH adjustment is effected through use of alkaline earth metal neutralizing agents, no soluble salts are formed as a result of such adjustment, the presence of which would undesirably contaminate the pigment and seriously impair its durability properties. Consequently, desired improvements in the durability characteristics of the pigment treated in accordance with the invention result, whereby it becomes particularly adapted for use in coating compositions, especially paints and enamels. Additionally, a novel method is afforded for incorporating the useful treating agent $Al_2O_3$ in the finished titanium dioxide pigment, wherein such compound imparts notably beneficial effects. Also, since more rapid settling of the coagulated pigment results, coupled with greater concentration and better filtering characteristics, due to the resultant thickened slurry within the desirable pH range of about 6.8 to about 7.6, the invention enables one to more economically filter and wash the pigment and obtain more readily a pigment, the pH of which is desirably non-acidic in character. Finally, the recovered pigment, after drying, may be dry ground and/or disintegrated to the required fineness more easily and economically. When the pigment is bagged and stored, even for a considerable length of time, it will be found that no increase in grit content takes place as a result of such storage, contrary to prior experiences. This result and avoidance of deterioration I ascribe to my novel method of alumina addition to a dispersed slurry of $TiO_2$ pigment containing $P_2O_5$ in excess of .25 part/100 parts of $TiO_2$. Titanium dioxide pigments are especially benefited by the novel treating agents of my invention, in that such pigments, when so treated, exhibit a pronounced resistance towards color change on subjection to the high temperature conditions necessarily prevailing during the production of baked enamels.

A further highly advantageous result and benefit which arises from my invention lies in the fact that the recovered $TiO_2$ pigment is in relatively pure condition and substantially free from soluble salts or contaminating quantities of phosphates, the presence of which seriously and adversely affects $TiO_2$ pigment properties, especially its durability characteristics and color, tinting strength, oil absorption, grit and texture values. Commercial titanium oxide pigments are usually obtained from the processing of titaniferous ores, especially ilmenite, by attacking and dissolving the same with sulfuric acid. These ores vary in respect to impurity content, which usually consists of phosphate-bearing minerals, and which are also relatively soluble in sulfuric acid. The phosphoric acid which is formed during ilmenite dissolution is present during subsequent hydrolysis and is absorbed by the $TiO_2$ precipitated from the hydrolysis. The phosphate content of the precipitate depends on the phosphoric and sulfuric acid concentrations present during the hydrolysis, and very little of the impurity, if any, is removed from the precipitate during the filtration and washing steps following hydrolysis. As a consequence, an amount of phosphate ranging from about .3% to about .75% (calculated as $P_2O_5$) presents itself in the hydrolysate prior to calcination. A substantial reduction (below substantially .25%) or complete elimination of this phosphate impurity from the $TiO_2$ is therefore desirable in the procurance of an acceptable, satisfactory commercial pigment. By the present invention, therefore, a novel method is provided whereby such phosphate impurities are rendered more or less entirely inactive, so that, even if present in any degree, they in no wise affect the essential pigment properties of the final $TiO_2$ product. Furthermore, this result is afforded through use of phosphate reactant or neutralizing compounds which additionally function as coagulating or flocculating agents for the $TiO_2$ slurry suspensions which have undergone hydro-separation.

I am aware that previously alum has been proposed for use in breaking pigment-oil-water emulsions in a method for preparing a pigment-oil composition end product. However, the pigments employed in such processes must be more preferentially wetted by oil than by water and be amenable to transfer into the oil phase, through use of an emulsifying agent prior to alum addition to effect flocculation. Such a process is obviously different from that of the instant invention, wherein coagulation of a dispersed aqueous $TiO_2$ pigment suspension, rather than a pigment-oil emulsion, is effected and the end product obtained comprises an insoluble, non-oil-containing titanium pigment.

This application is a continuation-in-part of my copending application Serial No. 191,967, filed February 23, 1938.

I claim as my invention:

1. A process for improving the classification and recovery of dispersed, previously-calcined titanium oxide pigment particles present as the fines in the alkaline overflow fraction of a continuous grinding and hydroseparating system, which comprises mixing with said overflow fraction a small amount of aluminum sulfate, adjusting the pH value of the resulting mixture to 6.9 and precipitating an insoluble barium compound on said pigment through incorporation of sufficient barium hydroxide, allowing the mixture to settle and thereafter filtering and recovering said titanium oxide pigment fines.

2. A process for improving the classification and recovery of dispersed, previously-calcined titanium oxide pigment particles present as the fines in the alkaline overflow fraction of a continuous grinding and hydroseparating system, which comprises mixing with said overflow fraction a small amount of chromic sulfate, adjusting the pH value of the resulting mixture to 6.9 and precipitating an insoluble barium compound on said pigment through incorporation of sufficient barium hydroxide, allowing the mixture to settle and thereafter filtering and recovering said titanium oxide pigment fines.

3. A process for improving the classification and recovery of dispersed, previously-calcined titanium oxide pigment particles present as the fines in the alkaline overflow fraction of a continuous grinding and hydroseparating system, which comprises mixing with said overflow fraction a small amount of ferric sulfate, adjusting the pH value of the resulting mixture to 6.9 and precipitating an insoluble barium compound on said pigment through incorporation of sufficient barium hydroxide, allowing the mixture to settle and thereafter filtering and recovering said titanium oxide pigment fines.

4. A process for improving the classification and recovery of dispersed, previously-calcined, anhydrous titanium oxide pigment particles having a phosphate content, calculated as $P_2O_5$, ranging from about .3 to .75%, said pigment particles being present as the fines-containing alkaline overflow fraction obtained in a continuous grinding and hydroseparating system, which comprises incorporating in said overflow fraction an amount of aluminum sulfate equivalent to about .5 to 1.5 g. $Al_2O_3$ per 100 g. of titanium oxide in suspension, adjusting the pH value of the resulting mixture to 6.9 and precipitating a small amount of an insoluble barium compound on said pigment particles by incorporating a sufficient quantity of barium hydroxide, agitating the resulting mixture to promote uniform admixture of the solution, permitting said solution to settle, and then filtering to recover the separated titanium oxide pigment fines.

5. A process for recovering and obtaining an improved titanium oxide pigment from the fines present in the overflow fraction from a pigment hydroseparating system, wherein said $TiO_2$ pigment is dispersed in aqueous slurry suspension by means of a small amount of an alkaline deflocculating agent, which comprises coagulating said dispersed $TiO_2$ pigment slurry by mixing therewith a small amount of a coagulating agent comprising an acid-reacting soluble salt of a trivalent metal from the group consisting of aluminum, chromium and iron, adjusting the pH value of the resulting mixture to 6.9 and precipitating an insoluble treating agent on said pigment by incorporating therein a sufficient quantity of barium hydroxide, and then filtering and recovering the resulting pigment product.

6. A process for recovering and obtaining an improved titanium oxide pigment having a phosphate content ranging from about .3 to .75%, calculated as $P_2O_5$, from the fines present in the overflow fraction from a pigment hydroseparating system in which the pigment is dispersed in aqueous suspension by means of the present of a small amount of an alkaline deflocculating agent, comprising coagulating the dispersed titanium oxide pigment slurry by mixing therewith about 1% of aluminum sulfate, based on the weight of the $TiO_2$ and calculated as $Al_2O_3$, agitating the resulting pigment suspension and coagulant to effect more intimate mixture therebetween, thence adding sufficient barium hydroxide to the mixture to adjust its pH value to 6.9 and precipitate water-insoluble $Al_2O_3$ on said pigment, and then filtering, washing, drying and recovering the resulting pigment product.

ROBERT M. McKINNEY.